Dec. 23, 1969   F. F. EHRICH   3,485,043
SHINGLED COMBUSTION LINER
Filed Feb. 1, 1968
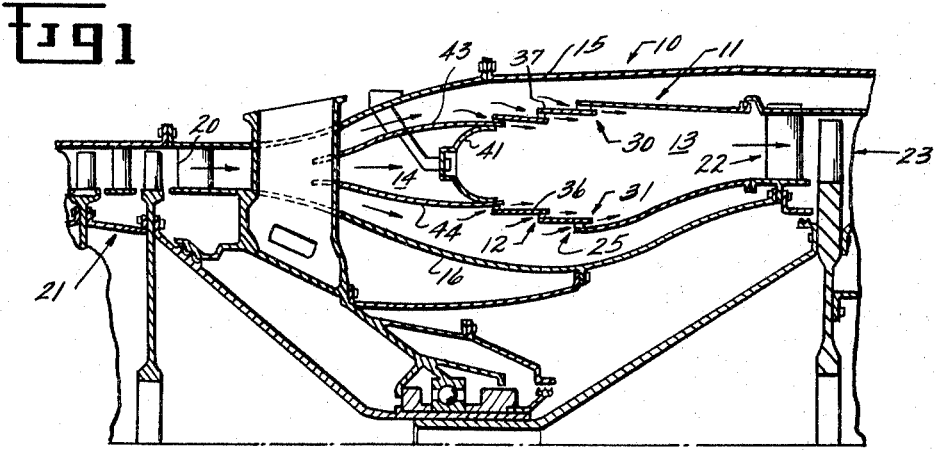
Inventor
FREDRIC F. EHRICH
ATTORNEY @# United States Patent Office 3,485,043
Patented Dec. 23, 1969

3,485,043
SHINGLED COMBUSTION LINER
Fredric Franklin Ehrich, Marblehead, Mass., assignor to General Electric Company, a corporation of New York
Filed Feb. 1, 1968, Ser. No. 702,427
Int. Cl. F02g 3/00; F02c 7/00; F23d 15/04
U.S. Cl. 60—39.65    3 Claims

ABSTRACT OF THE DISCLOSURE

A shingle-type combustion liner comprising arcuate segments of overlapping material separated by an air gap and joined together at a plurality of points in such a manner as to form air channels therebetween.

BACKGROUND OF THE INVENTION

Field of the invention

The invention relates generally to a novel combination joint-louver construction for joining together two arcuate segments of material which are subject to intense heat. Such a joint is obtained by providing the two arcuate segments of material with a plurality of fingers which overlap and join each other by means of a plurality of spacer members extending from the sides of the fingers of one arcuate segment thereby providing a plurality of circumferentially spaced louvers through which streams of cooling fluid are directed.

Description of prior art

In the combustion apparatus of a gas turbine engine, the actual combustion occurs within a zone or space defined by a combustion liner or wall. Combustion liners are normally of perforated construction for permitting large quantities of air to flow therethrough to the combustion space to support the combustion process and to dilute the combustion products to provide a desired turbine temperature, the liner separating the combustion space from an air space continually supplied with pressurized, relatively cool air by the engine compressor. To attain reasonably satisfactory performance and operating life, it is essential that the combustion liner be protected from the high temperature and high oxidation. For this purpose, combustion liners are typically provided with louvered joints constructed and arranged to extract relatively small quantities of air from the air space and to direct the extracted air into the combustion space such that it forms thin, insulating layers of cool air on the surface of the liner. These thin films not only protect the liner from direct contact with the high temperature gases, but also remove radiated heat through convective contact with the liner. Ideally, these films of cooling air provide sufficient, but not excessive quantities of cooling air and substantial uniform protection. In practice, however, the flow patterns normally existing within the combustion space and other combustion variables make it virtually impossible to provide uniform protection. Certain thermal gradients and accompanying stresses are to be expected in even the most effectively cooled liner.

These thermal conditions present in the combustion apparatus of a gas turbine engine can thus cause the eventual failure of a liner, the most common causes of failure being liner distortion due to thermal gradient and thermal fatigue caused by repeated heating and cooling of the liner. Thermal fatigue leads to cracking and eventual failure at the liner perforations and louvers. In an effectively cooled liner, these failures will occur only after long periods of operation and are for the most part localized in nature. To avoid the necessity of replacing an entire liner because of a localized failure, it is desirable that the liner be fabricated such that the elements can be easily disassembled, the defective part repaired or replaced, and the elements then reassembled into the complete assembly.

In some prior art construction, rivets or other mechanical fastening means were utilized which of course permitted easy disassembly and reassembly, but experience has disclosed that the use of such devices typically leads to a less effective cooled liner and hence, reduced operating life. One of the reasons for this is that the fastening means typically interfere with air flow through the cooling joints, causing wakes and non-uniformities in the cooling air film thereby increasing thermal gradients and stresses in the liner.

SUMMARY OF THE INVENTION

The present invention obviates many of the deficiencies noted above and is capable of being quickly and easily constructed. Briefly stated, in carrying out the invention in one form, a combustion liner comprises a plurality of components which cooperate to form a joint through which cooling air is supplied in order to film cool the high temperature side of the liner. In construction, the joint is formed of first and second overlapping wall members, each having a plurality of fingers which overlap and join each other by means of a plurality of spacer means attached to and extending from the sides of the fingers of one member, said spacer means maintaining the wall member in a spaced apart relationship, thus forming a cooling air passage communicating at its upstream end with an air space on one side of the liner and at its downstream end with a high temperature combustion space on the other side. To secure the elements into an integral structure, the spacer means are pinned by any suitable fastening means to the sides of a plurality of fingers of the first wall member.

Accordingly, it is thus the primary object of the invention to provide in combustion apparatus an improved liner or wall which can be easily disassembled for repair or replacement of defective elements.

A still further object is to provide an improved combustion wall or liner which is characterized by simple and low cost construction and maintenance in combination with long and reliable operation.

These and other objects, advantages, and features of the subject invention will hereinafter appear and for the purposes of illustration, but not of limitation, exemplary embodiments of the subject invention are shown in the appended drawing.

BRIEF DESCRIPTION OF THE DRAWING

FIG. 1 is a partial cross-sectional view of the combustion apparatus of a gas turbine engine, the combustion apparatus including combustion wall means utilizing the joint construction of this invention;

FIG. 2 is an enlarged partial view, in perspective, of one of the joint constructions of FIG. 1 prior to being assembled;

FIG. 3 is an enlarged partial view, in perspective, of one of the joint constructions of FIG. 1 completely assembled;

FIG. 4 is a partial cross-sectional enlarged view of a joint construction taken along viewing line 4—4 of FIG. 3.

DESCRIPTION OF THE PREFERRED EMBODIMENT

Referring first to FIG. 1, a portion of a gas turbine engine 10, including a combustor 11 having a liner or combustion wall means 12 for defining an annular combustion zone or space 13, within an annular air space 14. The air space 14, which is formed between the engine casing 15 and an inner casing 16, communicates with the discharge portion 20 of axial flow compressor 21, and the combustion space 13 communicates at its downstream end with the inlet portion 22 of a turbine 23. The combustion wall means 12 has a plurality of perforations or openings 25 therein for admitting relatively large quantities of compressed air from the air space 14 to the combustion space 13 in order to support combustion and dilute the products of combustion.

The compressor 21, the air space 14, the combustion space 13, and the turbine 23 are thus interconnected in serial flow arrangement, the direction of flow being indicated by the larger arrows of FIG. 1.

As previously indicated, it is essential that the combustion wall means 12 be protected from the high temperature and high oxidation within the combustion space 13. To provide this necessary cooling in a highly effective manner, and at the same time permit easy disassembly and reassembly, the combustion wall means 12 is formed of a number of elements arranged such that a plurality of unique joints generally represented by 30 and 31 are provided for the passage of cooling air from the air space 14 into the combustion space 13.

Still referring to FIG. 1, the combustion wall means 12 comprises an outer wall formed of overlapping wall members, an annular dome 41 having downstream ends disposed in overlapping relationship with the upstream portion of the overlapping wall members, and cowls 43 and 44 projecting upstream from the inner and outer walls and the dome 41 into the air space 14. These combustion wall elements are arranged such that the joints generally represented by 30 and 31 include annular passages through which relatively cool air from the air space 14 can flow as indicated by the small arrows of FIG. 1.

Turning now to FIGS. 2-4, the construction of the joints generally indicated as 30 and 31 will be described in detail. As illustrated, the downstream portion of the wall member 36 is overlapped by the upstream portion of the wall member 37, the overlapping portions being of a generally cylindrical configuration.

Your attention is drawn to FIGS. 2 and 3 which represents an enlarged version of joints 30 and 31. In FIG. 2, the downstream portion of wall member 36 is cut into a plurality of first fingers 50 and second fingers 51 each being separated by slots 52. As noted, the first fingers 50 have placed therebetween second fingers 51 in an alternately arranged pattern, second fingers 51 being shorter than first finger 50.

The upstream end of overlapping wall member 37 is cut and bent in the manner indicated in order to form a plurality of U-shaped members generally indicated as 55, being formed by cutting into the upstream end of wall member 37 an opening the width of which corresponds to the width of fingers 50 and the length of which corresponds to the length of slot 52. A portion of said U-shaped member is bent in such a manner as to form spacer means 56 which slides into slot 52 thereby separating wall member 36 from wall member 37, thereby forming the openings in the wall means 25 through which cooling air can flow axially from the portion of the air space 14 and be discharged along the surface of wall member 37.

Drawing your attention to FIG. 3, joints 30 and 31 are disclosed in a final assembled condition wherein wall member 37 overlaps and joins wall member 36. As noted, spacer means 56 are fitted into slots 52 and then fastened to the sides of the fingers 50 and 51 of the downstream portion of wall member 36. It is to be understood that the two wall members may be fastened together by any fastening means or fastening process such as welding, brazing, etc., which is well known in the art.

In order to regulate the amount of air desired to be passed through the openings 25 of the wall means, it is possible to bend fingers 50 in order to adjust the size of the opening and thus regulate the volume of air passing therethrough. FIG. 4, which is a view taken along 4—4 of FIG. 3, shows how fingers 50, which extend past the opening may be bent into any desired position to adjust the opening.

Although the description of construction of these novel joints was directed solely to joints as represented by 30 and 31, it is understood that the construction of the joints may be utilized as many times and in as many places as it is necessary in the combustion wall means 12. In addition, it is noted that the present invention has been described in conjunction with an annular combustor 11 of a gas turbine engine 10. It will be readily apparent that the invention has general utility with respect to combustors having louvered walls, including but not limited to, annular combustors.

It will thus be appreciated that the unique joint construction of the invention provides highly effective cooling both at the joint and on the combustion wall downstream of the joint. The joint construction thus provides long and reliable operation due to effective cooling and simple and low cost construction and maintenance due to its mechanical structure.

It will be understood that the invention is not limited to the specific details of the construction and arrangement of the particular embodiments illustrated and described herein.

What is claimed as new and is desired to secure by Letters Patent of the United States is:

1. In a combustion apparatus, combustion wall means for separating and at least partially defining a combustion space and an air space, said combustion wall means including a combination mechanical joint-air passage structure comprising, a first wall member;

a second wall member overlapping said first wall member;

a plurality of spacer means securing said wall members in spaced relation, said spacer means and said wall members cooperatively defining a plurality of air passages through said joint; and a plurality of fingers extending under said second wall member from said first wall member, said fingers being disposed adjacent alternate of said air passages and adapted to be bent with respect thereto to regulate air flow therethrough.

2. The combination wall means recited in claim 1 wherein the said spacer means comprises a plurality of U-shaped members integrally formed with said second wall member and overlapping and secured to said first wall member, said air passages being defined by said wall members and the legs of said U-shaped members.

3. The combustion wall means recited in claim 2 wherein said fingers are integrally formed with said first wall member.

References Cited

UNITED STATES PATENTS 2,933,895   4/1960   Cheeseman ____ 60—39.65 XR
3,064,425   11/1962  Hayes _____ 60—39.65

CARLTON R. CROYLE, Primary Examiner

A. D. HERRMANN, Assistant Examiner

U.S. Cl. X.R.

431—351